United States Patent [19]
Buckland et al.

[11] Patent Number: 6,095,446
[45] Date of Patent: Aug. 1, 2000

[54] TAPE DRIVE WITH MOVABLE CENTERING GUIDE AND DOOR OPENING ARRANGEMENT

[75] Inventors: Kurt A. Buckland, Yorba Linda; Walter Fehlmann, Fountain Valley, both of Calif.

[73] Assignee: Seagate Technology, Inc., Scotts Valley, Calif.

[21] Appl. No.: 09/259,588

[22] Filed: Mar. 1, 1999

Related U.S. Application Data

[62] Division of application No. 08/938,408, Sep. 26, 1997, Pat. No. 5,890,669, which is a continuation of application No. 08/555,427, Nov. 9, 1995, abandoned.

[51] Int. Cl.$^7$ .......................... G11B 23/04; G11B 5/008
[52] U.S. Cl. ...................... 242/336; 242/338; 242/338.4; 360/94
[58] Field of Search ..................... 242/336, 338, 242/338.2, 338.4; 360/94, 96.5

[56] References Cited

U.S. PATENT DOCUMENTS

| | | | |
|---|---|---|---|
| 4,556,928 | 12/1985 | Olmsted | 360/93 |
| 5,109,308 | 4/1992 | Kukreja et al. | 360/93 |
| 5,237,469 | 8/1993 | Kukreja et al. | 360/93 |
| 5,314,141 | 5/1994 | Ishii et al. | 360/94 X |
| 5,386,329 | 1/1995 | Ikegawa | 360/94 |

*Primary Examiner*—John Q. Nguyen
*Attorney, Agent, or Firm*—McDermott, Will & Emery

[57] ABSTRACT

A tape drive for accommodating tape cartridges of different sizes and capacities is provided with a tape insertion opening, a first guide at a first side of the tape insertion opening, and a second guide at a second side of the tape insertion opening. The first and second guides are separated from one another to provide a first opening width that accommodates insertion of tape cartridges of a first size between the first and second guides. The first and second guides are movable within the tape insertion opening to provide a second opening width that accommodates insertion of tape cartridges of a second size.

13 Claims, 11 Drawing Sheets

TAPE DRIVE WITH MOVABLE CENTERING GUIDE AND DOOR OPENING ARRANGEMENT

This application is a divisional of application Ser. No. 08/938,408 filed Sep. 26, 1997, U.S. Pat. No. 5,890,669 which is a continuation of application Ser. No. 08/555,427 filed Nov. 9, 1995 abandoned.

FIELD OF THE INVENTION

The present invention relates to the field of tape drives, and more particularly, to a novel tape drive that can accommodate tape cartridges of different sizes.

BACKGROUND OF THE INVENTION

Conventional tape drives, such as those used in data archival tape systems, are designed for use with a standard size tape cartridge, such as that depicted in FIG. 1. Exemplary dimensions of the tape cartridge 10 are 8 cm wide ($W_I$) by 6 cm deep (arrows D) and 1.4 cm high. The tape cartridge 10 has two tape reels 12 which are driven by a drive capstan 14. Guide posts 15 guide the tape 17 from the reels past a cartridge door 16. The cartridge door 16 is provided on the front end of the tape cartridge 10 and is pivoted around a pivot 18 to swing open in the direction of arrow 19. When the cartridge door 16 is open, the tape 17 is exposed to a recording head (not illustrated) for recording on the tape 17.

FIGS. 3–5 depict a portion of a standard tape drive 21 and the insertion of the standard tape cartridge 10 into that drive. The tape drive 21 has a mouth 23, and a stationary door opener 25 within the mouth 23. The sequence of FIGS. 3–5 demonstrate the pivoting of the cartridge door 16 upon insertion of the tape cartridge 10 by the door opener 25 when the outer edge 20 of the cartridge door 16 is pushed against the door opener 25. In FIG. 3, the tape cartridge 10 is about to be inserted into the drive, positioned in alignment with the drive mouth 23. As the cartridge 10 enters the drive 21, shown in FIG. 4, the cartridge door 16 begins to pivot open as it is brought into contact with opener 25. Once the cartridge door 16 is open and the tape cartridge 10 fully inserted (FIG. 5), the tape 17 in the tape cartridge 10 is exposed to recording head 27.

With increases in system memory capacity, there is a need for increased archival capacity. This can be provided by higher capacity tape cartridges, containing a longer tape than contained in the standard tape cartridges 10. Due to the greater length of tape, an increased capacity tape cartridge will necessarily be larger in size than a standard tape cartridge 10. However, tape drives that can accommodate a larger capacity tape cartridge should also be able to accommodate a standard capacity tape cartridge to provide users with the option of which tape cartridge to use in a particular circumstance.

One type of higher capacity tape cartridge has a front end (the load side) that is necked down to 8 cm wide to fit into a standard size drive mouth. A top view of an embodiment of such a tape cartridge with increased archival capacity is depicted in FIG. 2. This high capacity tape cartridge 30 contains the same internal elements as that of the standard tape cartridge 10 of FIG. 1. Hence, the high capacity tape cartridge 30 has tape reels 32, drive capstan 34, and guide posts 35. The tape cartridge 30 also has a cartridge door 36 pivotally mounted at pivot 38.

The front end 37 (the load end) of the tape cartridge 30 has the same width (e.g., 8 cm) as the front end of the standard tape cartridge 10. However, to provide the increased capacity for holding the longer tape, the housing 40 of the high capacity tape cartridge 30 is both deeper and wider toward the rear end 39 of the cartridge 30. As exemplary dimensions, when the high capacity tape cartridge 30 has an inner width $W_I$ of 8 cm (the same as the width $W_I$ of the standard tape cartridge 10), the outer width $W_O$ is 9.5 cm, and the depth D is 7.2 cm. The height of the high capacity tape cartridge 30 is the same as that of the standard capacity tape cartridge 10.

The widened rear end 39 of the high capacity tape cartridge 30 prevents the tape cartridge 30 from being inserted in a standard tape drive to the extent necessary to fully open the cartridge door 36. In order to insert such a higher capacity tape cartridge 30 into a standard tape drive, a drive mouth 41 must be made wider and a cartridge door opener 43 within the drive mouth 41 must be positioned inwardly toward the recording head 45, such as depicted in FIG. 6a. However, simply making the drive mouth 41 of a tape drive wider and moving the door opener 43 inward to accommodate a larger tape cartridge 30, causes the cartridge door 36 to open too late and hit the recording head 45. FIG. 6b depicts a partially inserted tape cartridge 30, and this late opening of the cartridge door 36.

There is therefore a need for a tape drive that can accommodate both the standard capacity tape cartridges and the higher capacity tape cartridges, and still ensure that the cartridge door of the tape cartridges will clear the recording head as the tape cartridges are inserted into the tape drive.

SUMMARY OF THE INVENTION

This and other needs are met by the present invention which provides a door opening and tape cartridge centering arrangement for a tape drive, comprising a tape insertion opening, a first guide at a first side of the tape insertion opening, and a second guide at a second side of the tape insertion opening. The first and second guides are separated from one another to provide a first opening width that accommodates insertion of tape cartridges of a first size between the first and second guides. The first and second guides are movable within the tape insertion opening to provide a second opening width that accommodates insertion of tape cartridges of a second size.

The use of a door opener and centering guide that is movable within the drive mouth of a tape drive mechanism allows the door opener to be moved inwardly, but avoids opening the cartridge door too late. Since the door opener is moved as a result of the insertion of a larger capacity tape to expose a wider drive mouth, the tape drive mechanism is able to accommodate different size and capacity tape cartridges. A single tape drive can then be used with either a standard or a high capacity tape cartridge, depending on the needs of the user.

The foregoing and other features, aspects and advantages of the present invention will become more apparent from the following detailed description of the present invention when taken in conjunction with the accompanying drawings.

DETAILED DESCRIPTION OF AN ILLUSTRATIVE EMBODIMENT

Figure 1:
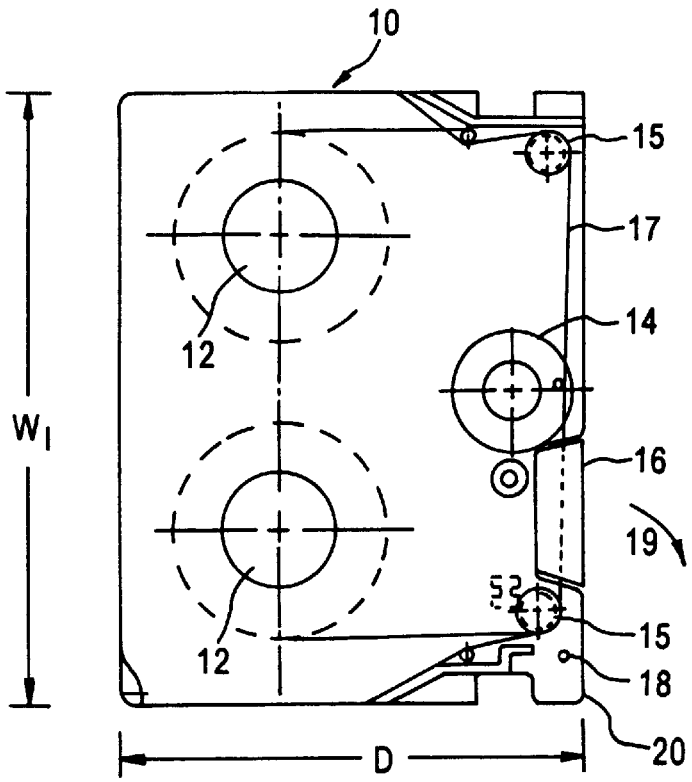
FIG. 1 is a top view of a standard size and capacity tape cartridge.
Figure 2:
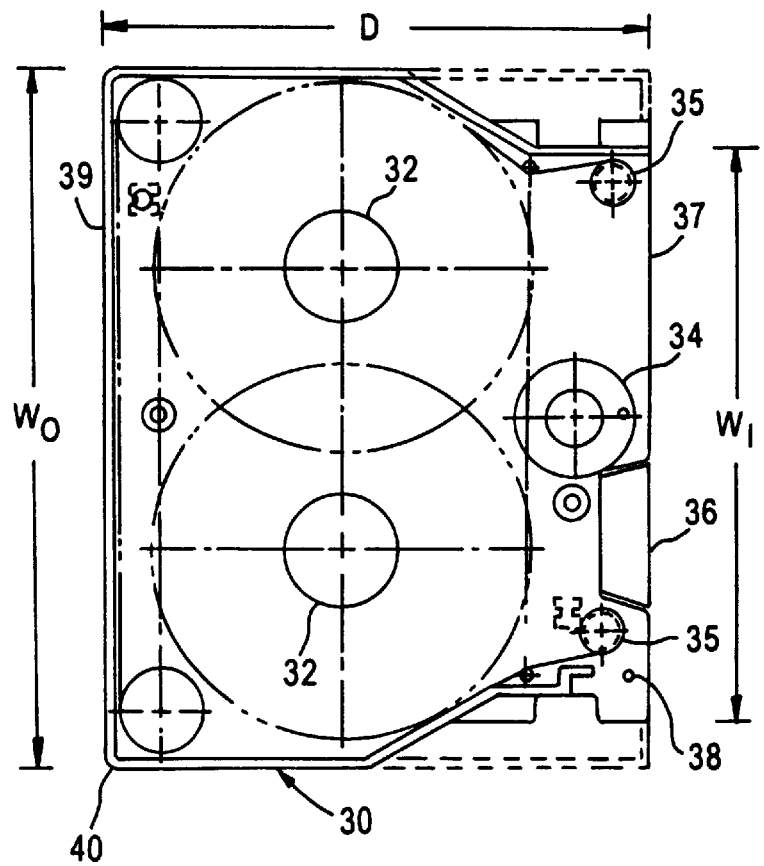
FIG. 2 is a top view of an embodiment of a high capacity tape cartridge.
Figure 3:
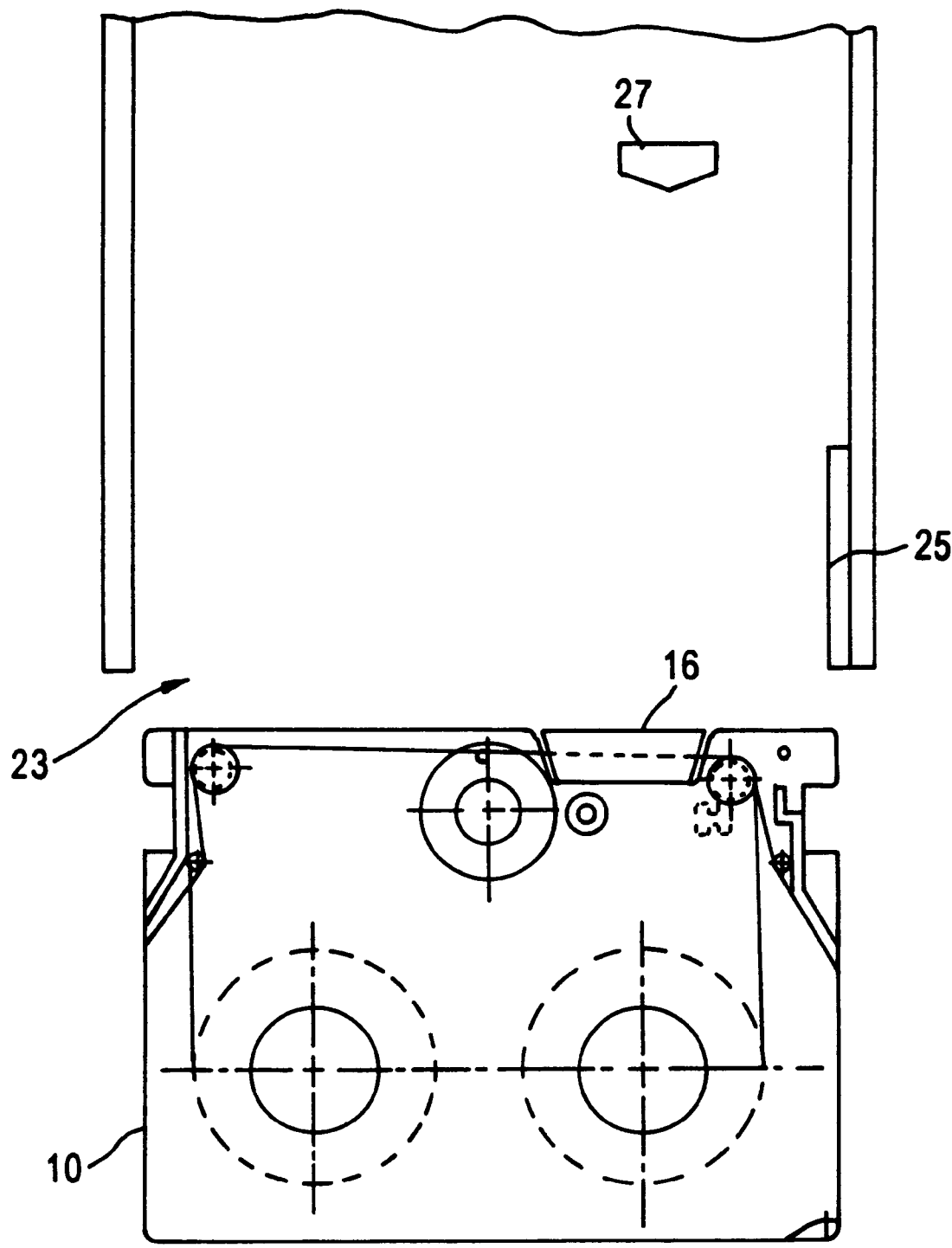
FIG. 3 is a top, cut-away view of the drive mouth of a standard tape drive and standard tape prior to insertion in the tape drive.
Figure 4:
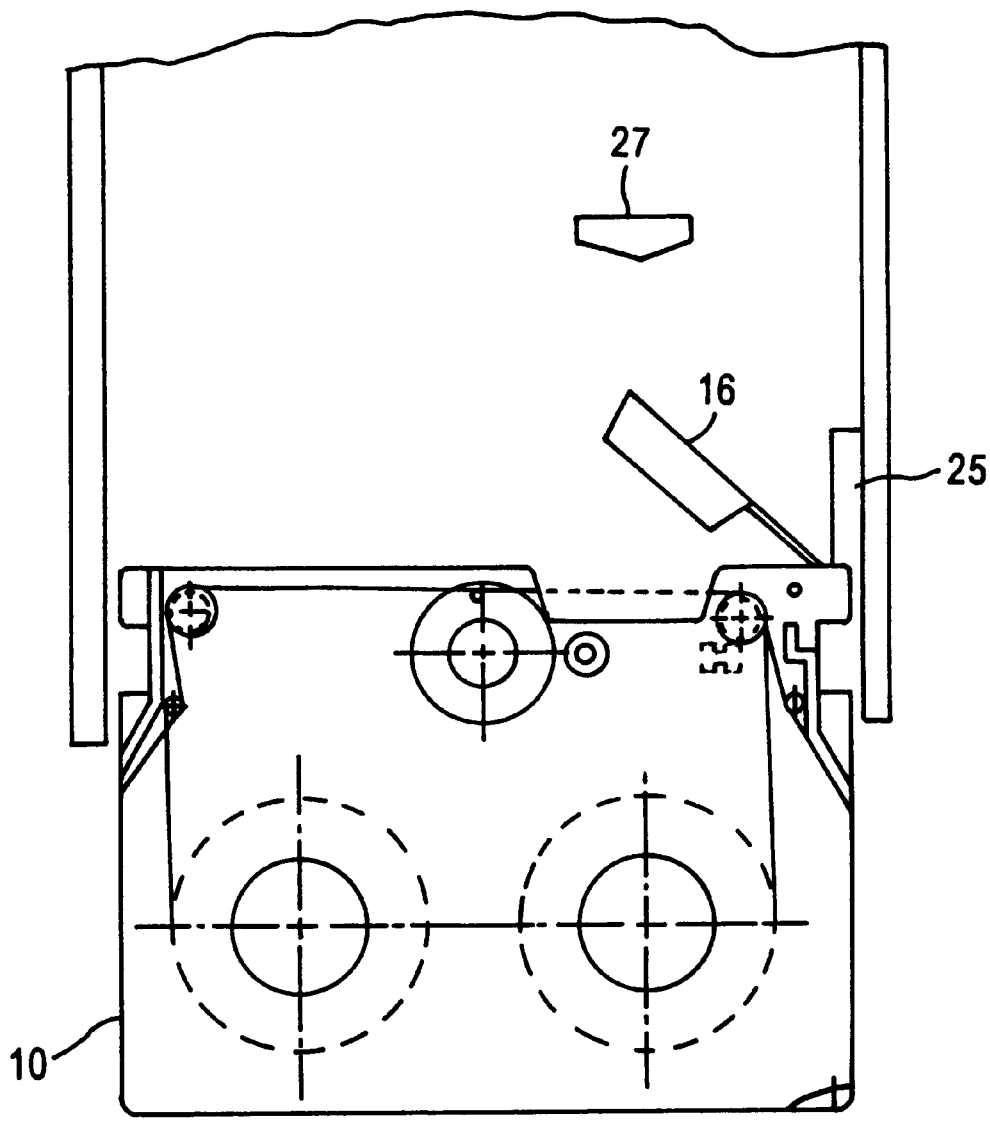
FIG. 4 is a top, cut-away view of the drive mouth of a standard tape drive and standard tape partially inserted in the tape drive.
Figure 5:
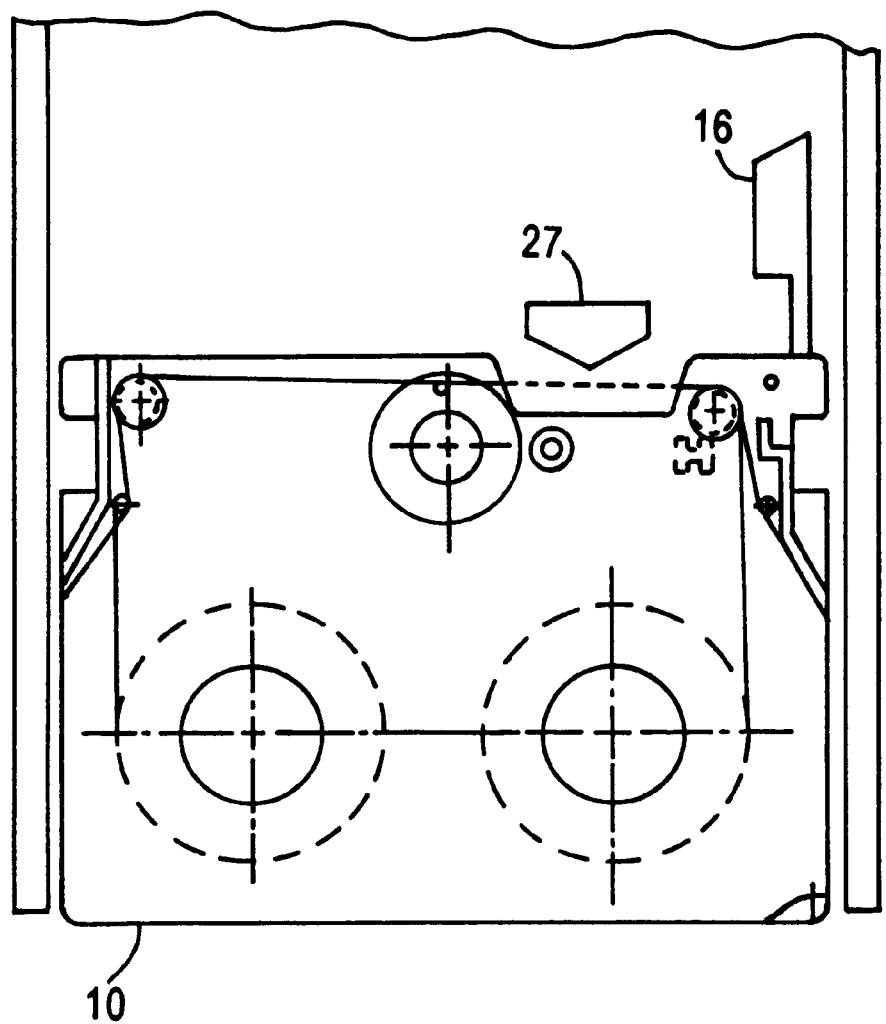
FIG. 5 is a top, cut-away view of the drive mouth of a standard tape drive and standard tape fully inserted in the tape drive.
Figure 6A:
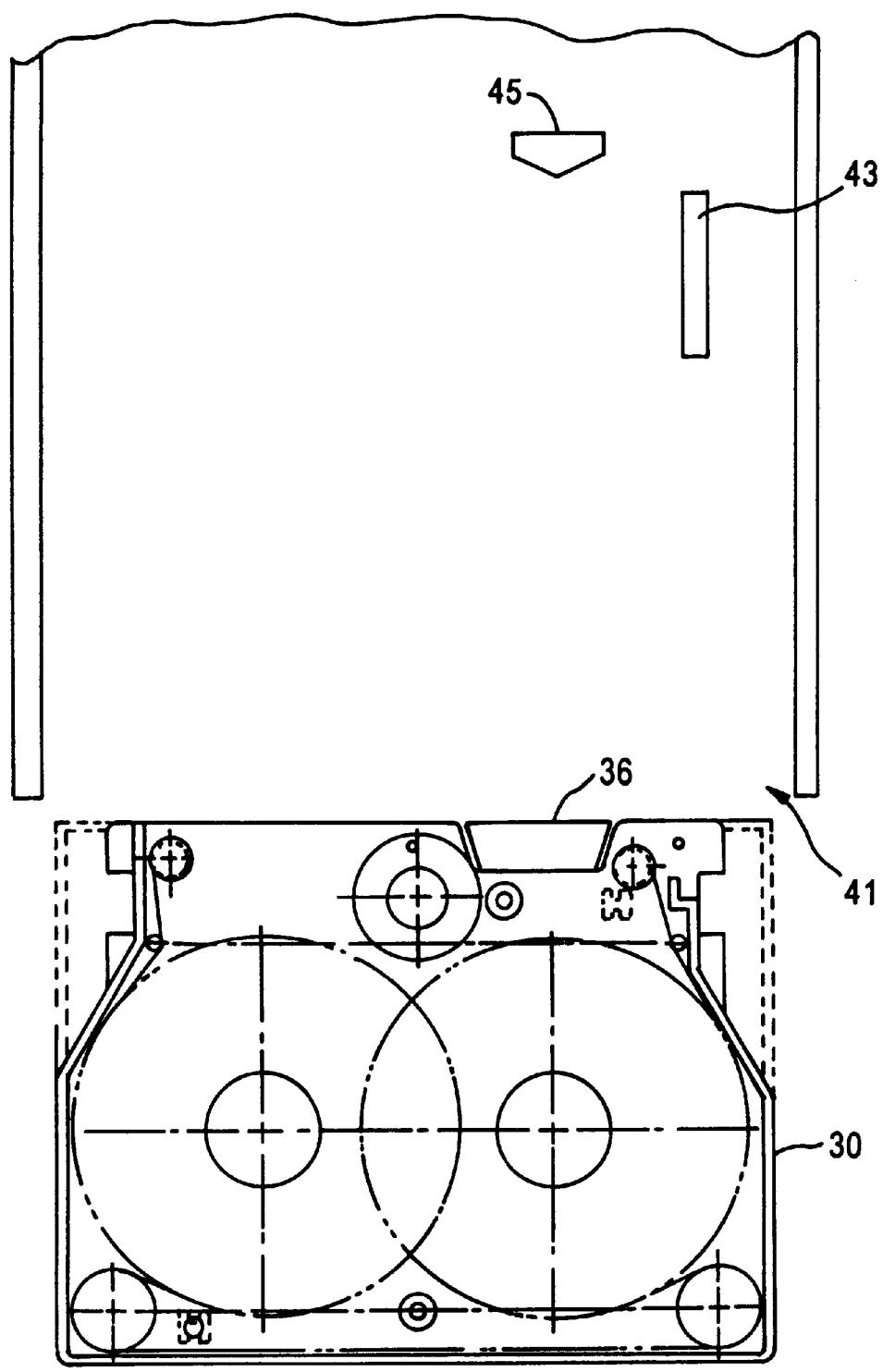
FIG. 6a is a top, cut-away view of a modified standard tape drive prior to the insertion of a tape cartridge.
Figure 6B:
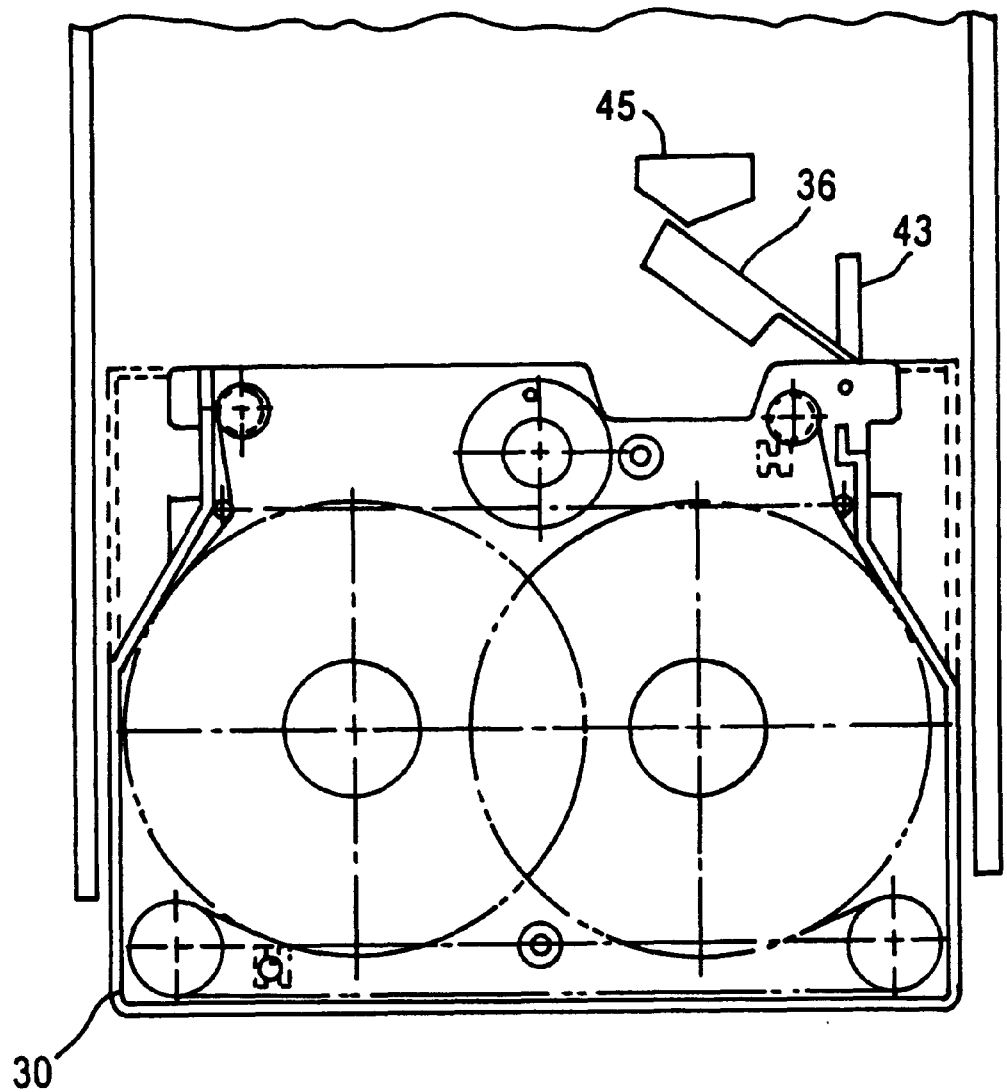
FIG. 6b is a top, cut-away view of the modified standard tape drive of FIG. 6a during attempted insertion of a tape cartridge.
Figure 7A:
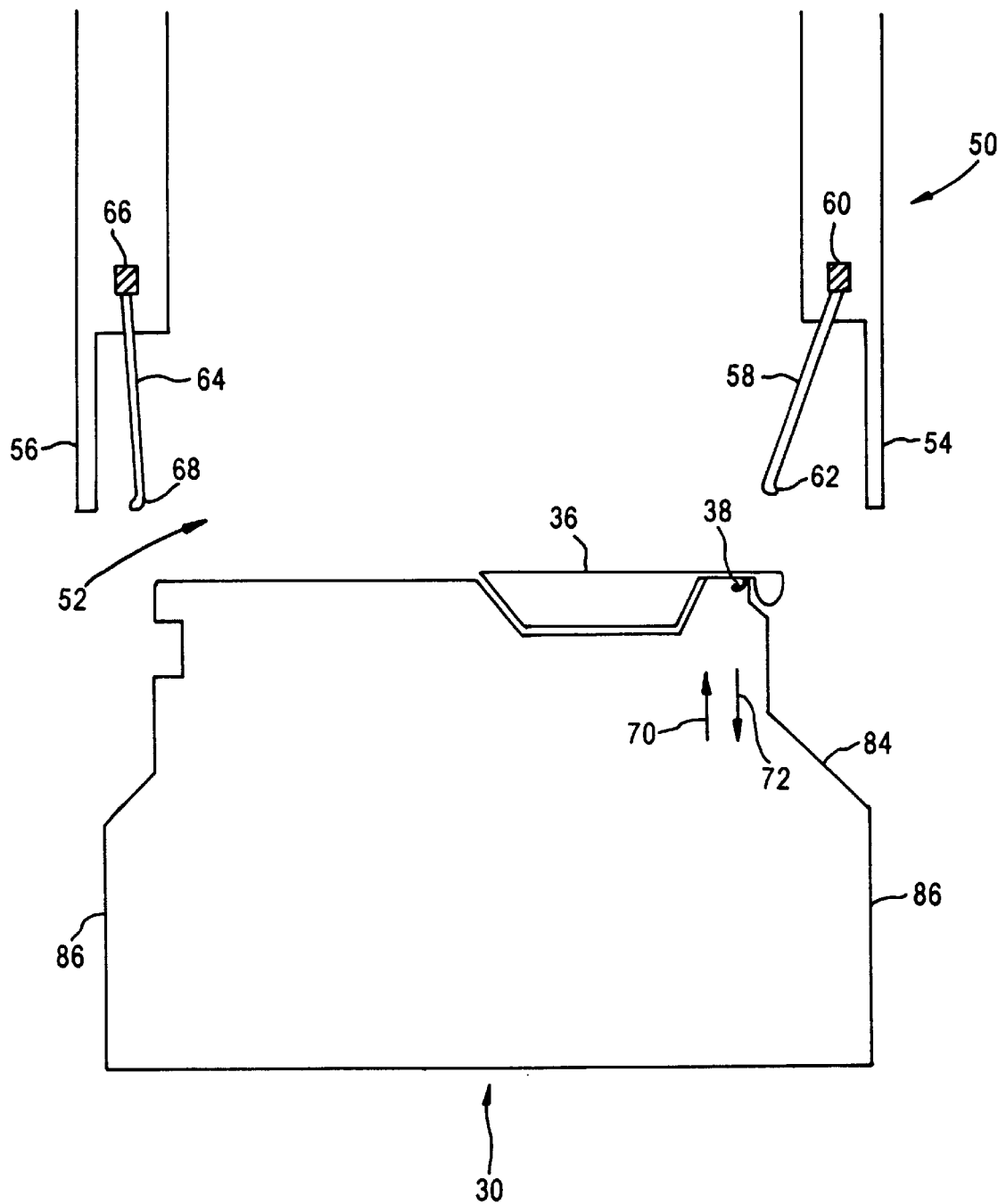
FIG. 7a is a top, cut-away view of the drive mouth of a tape drive constructed in accordance with an embodiment of the present invention, prior to insertion of a tape cartridge.

FIG. 7a is a top view of a drive mouth region of a tape drive mechanism 50 constructed in accordance with an embodiment of the present invention. As the other elements of the tape drive mechanism 50 are conventional in nature, these other elements are, for brevity, not illustrated.

The tape drive mechanism 50 has a drive mouth 52 into which standard and high capacity tape cartridges 10, 30 can be inserted. The drive mouth 52 has an outer width defined by a first side 54 and a second side 56. This outer width corresponds to the outer width $W_O$ of the high capacity tape cartridge 30, and is therefore approximately 9.5 cm in certain preferred embodiments.

A door opener 58 is located in the drive mouth and is depicted in FIG. 7a in its first position. The door opener 58 comprises a spring guide with a fixed end 60 and a free end 62 that catches the cartridge door. The spring guide (door opener) 58 extends at an acute angle from the side 54 of the interior of the drive mouth 52. The free end 62 of the spring guide 58 is a contact portion that contacts the cartridge door 36 of a tape cartridge 30 to open the cartridge door as the tape cartridge 30 is inserted into the tape drive.

A second spring guide 64 is fixed at one end 66 on the opposite side 56 of the drive mouth 52. The second spring guide 64 also extends from its fixed end 66 at an acute angle. The free ends 62, 68 of the spring guides 58, 64 are separated from one another by a width approximately equal to the width $W_I$ of a standard tape cartridge 10. Accordingly, when a standard tape cartridge 10 is inserted into the tape drive, the tape cartridge 10 fits between the spring guides 58, 64. There is therefore substantially no movement of the spring guides 58, 64 during insertion of a standard tape cartridge 10, although the first spring guide 58 will interact with the cartridge door 16 to pivot the cartridge door open.

Figure 7B:
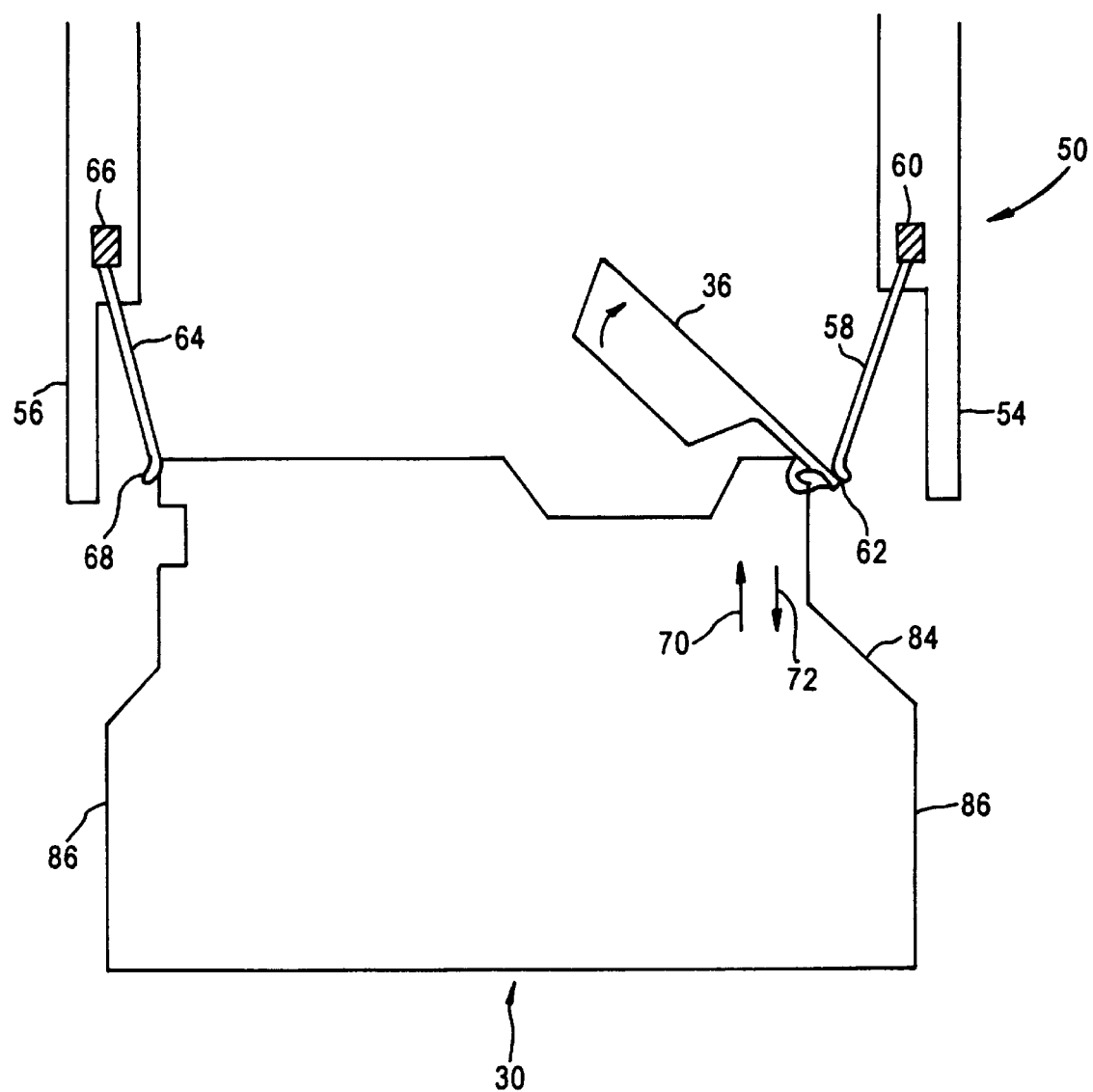
FIG. 7b is a view similar to FIG. 7a, but with the high capacity tape cartridge of FIG. 2 partially inserted into the drive mouth.

The first and second spring guides 58, 64 are biased to resist movement towards the respective side walls 54, 56 such that the spring guides 58, 64 remain substantially in the illustrated first position until the cartridge door 36 is fully open (see FIG. 7b). However, when a high capacity tape cartridge 30 is more fully inserted, the force exerted by the housing walls 84 against the spring guides 58, 64 overcomes the resistance of the biasing force. The spring guides 58, 64 are thus moved (or deflected) towards the respective sides 54, 56 of the drive mouth 52 (see FIG. 7c) as the high capacity tape cartridge 30 is fully inserted.

Figure 7C:
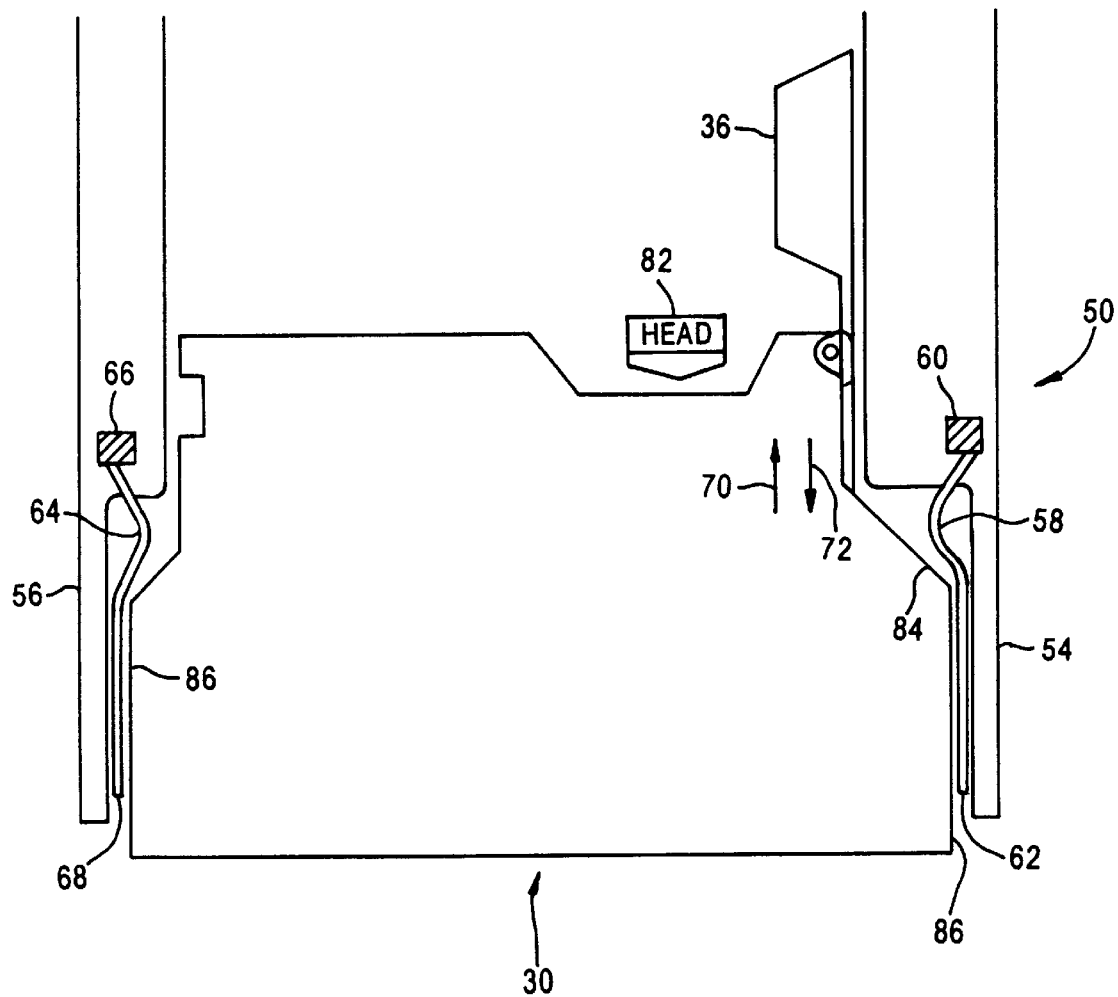
FIG. 7c is a view similar to FIG. 7a, but with the high capacity tape cartridge of FIG. 2 fully inserted into the drive mouth.

The spring guides 58, 64 act to center tape cartridges, both standard and high capacity types, and also open their cartridge doors. By moving between first and second positions, the spring guides 58, 64 are able to accommodate tape cartridges of different sizes and capacities. Although the exemplary embodiment of FIGS. 7a–7c depicts the centering and door opening arrangement of the present invention as having spring guides, other embodiments of the invention provide guides that are biased in other manners. For example, springs may be provided that extend perpendicularly from the sides to contact and bias guides that extend at acute angles from the sides.

Another embodiment of the present invention is depicted in FIGS. 8a–8d, this embodiment also being able to accommodate at least two different sized tape cartridges. Instead of having guides that are moved or deflected out to the sides of the drive mouth 52, however, this embodiment has guides that are slidable back and forth along the insertion direction to provide different insertion widths.

A first centering guide 88 acts as a door opening centering guide to open the cartridge door (16, 36) of tape cartridges 10, 30. The door opening centering guide 88 is slidably coupled to the interior side of the drive mouth. It cooperates with another centering guide 90 slidably coupled to the opposite interior side of the drive mouth. The two centering guides 88, 90 are coupled to one another and biased in the forward position (depicted in FIG. 8a) by a return spring 92. In preferred embodiments of the present invention, the return spring 92 is a wire form return spring. In other embodiments, the biasing force is provided by other types of biasing devices, for example, by individual coil springs longitudinally aligned in the direction of movement of the slides 88, 90.

Figure 8A:
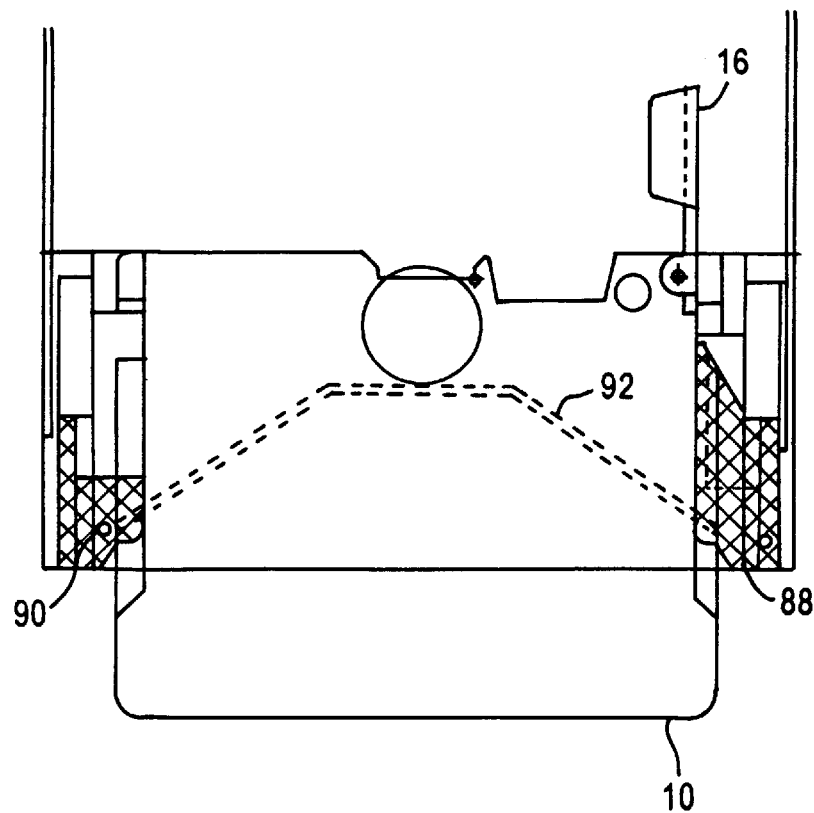
FIG. 8a is a top, cut-away view of the drive mouth of a tape drive constructed in accordance with another embodiment of the present invention, after insertion of a standard tape cartridge shown in FIG. 1.

As depicted in FIG. 8a, the centering guides 88, 90 are spaced apart from one another to accommodate a standard tape cartridge 10 between them. Hence, during insertion of a standard tape cartridge 10, the door opening centering guide 88 will contact the cartridge door 16 and pivot it open, but the two guides 88, 90 will remain in the first, illustrated position due to the biasing by the return spring 92.

Figure 8B:
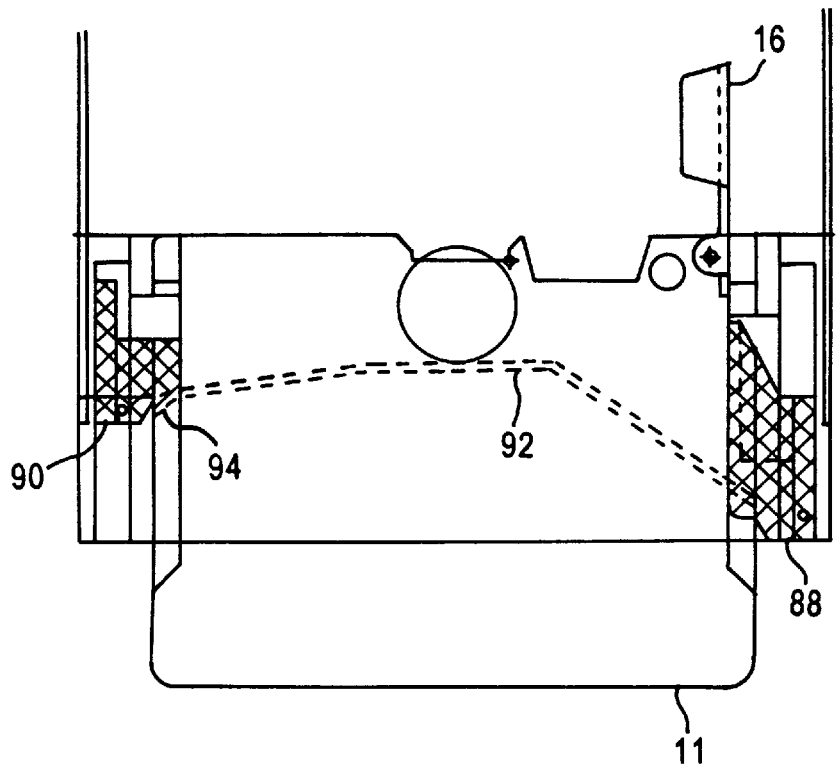
FIG. 8b is a view similar to FIG. 8a, but with a tape cartridge having a wide lockout feature inserted into the drive mouth.

A feature of preferred embodiments of the present invention is the independent mobility of the two guides 88, 90. In FIG. 8b, a tape cartridge 11, that is substantially the same size as a standard tape cartridge, also has a wide tape lockout feature 94 on the left hand side of the tape cartridge 11 as viewed from above in FIG. 8b. This wide tape lockout feature pushes against the centering guide 90 during insertion of the tape cartridge 11. The centering guide 90 is pushed back against the force of the return spring 92. However, as the walls of the tape cartridge 11 do not push against the door opening centering guide 88, this centering guide 88 remains in its first position.

Figure 8C:
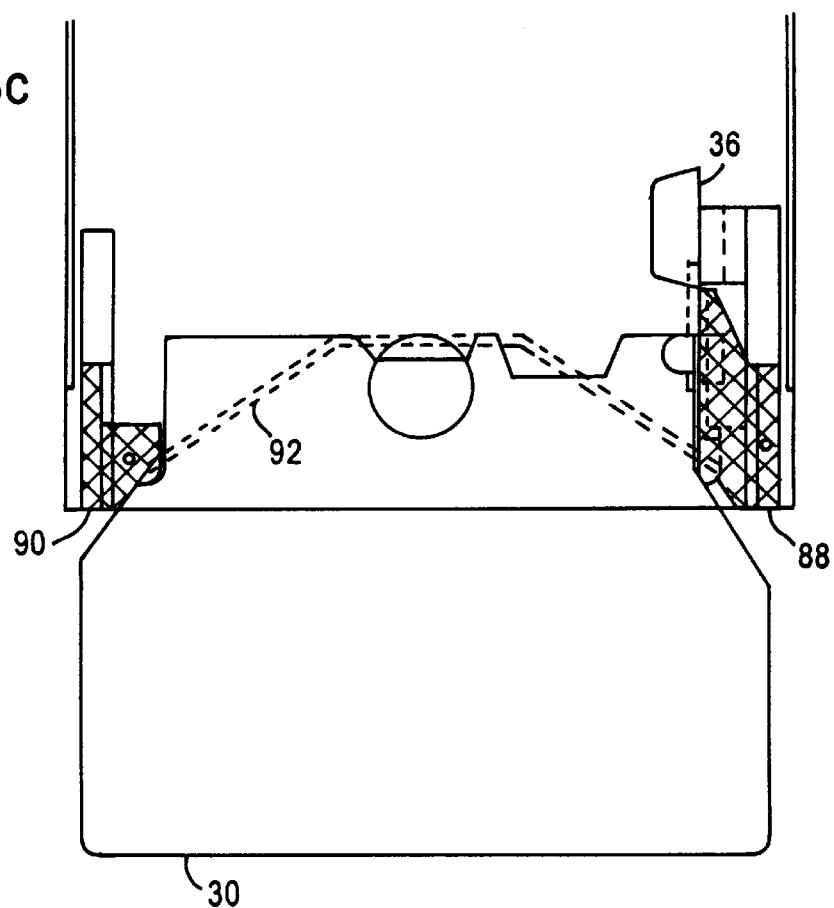
FIG. 8c is a view similar to FIG. 8a, but with the high capacity tape cartridge of FIG. 2 partially inserted into the drive mouth.
Figure 8D:
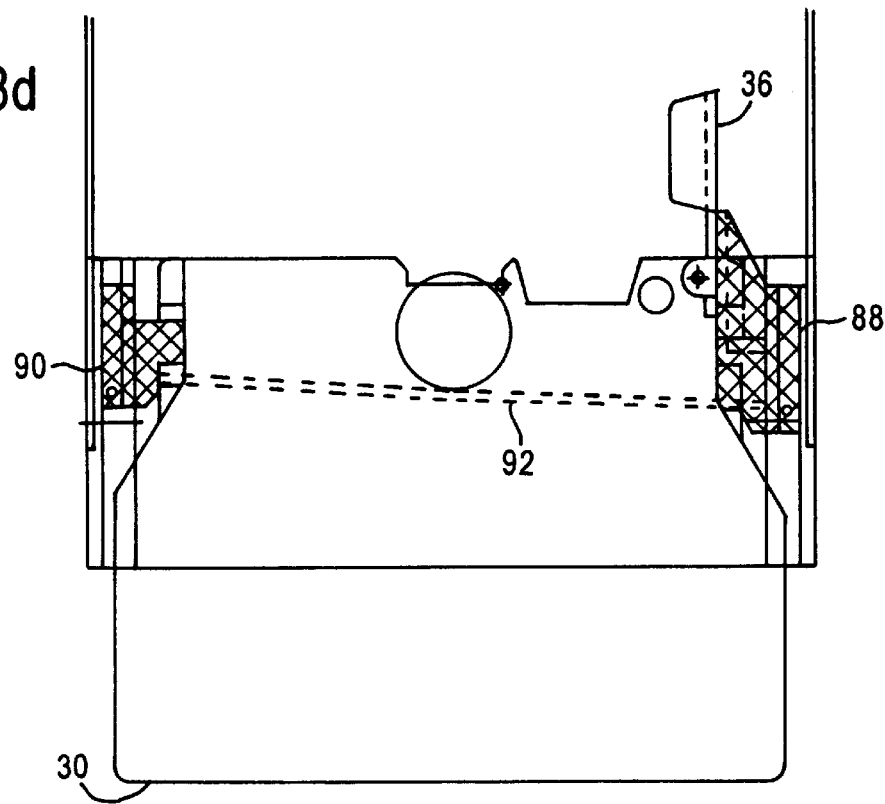
FIG. 8d is a view similar to FIG. 8c, but with the high capacity tape cartridge of FIG. 2 fully inserted into the drive mouth.

FIGS. 8c depicts the partial insertion of a high capacity tape cartridge 30 into a tape drive of this embodiment, and FIG. 8d depicts the tape drive with a high capacity tape cartridge 30 that has been fully inserted. As the necked down front end is being inserted into the tape drive, its cartridge door 36 is pivoted open by contact with the door opening centering guide 88. The force causing the opening of the door 36 is not enough to overcome the biasing force exerted by the return spring 92 on the door opening centering guide 88, however, which remains in place. Hence, the centering guides 88, 90 are not moved from their first positions during the partial insertion of the high capacity tape cartridge 30, as they are not pushed back by the necked down front end. It is only when the angled walls of the high capacity tape cartridge 30 push against the centering guides 88, 90 that they move back against the force of the return spring 92. The movement back by the centering guides 88, 90 to their second, retracted position exposes a wider opening to accommodate the widened rear end of the high capacity tape cartridge 30 in the insertion opening or drive mouth of the tape drive.

Upon removal of the high capacity tape cartridge 30, the centering guides 88, 90 are moved back to the first positions by the return spring 92.

The embodiments of the tape drive of the present invention with a movable door opening and centering arrangement thus allows both standard capacity tape cartridges and high capacity tape cartridges to be used in the same tape drive.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A door opening and tape cartridge centering arrangement for a tape drive, comprising:

a tape insertion opening;

a first guide at a first side of the tape insertion opening;

a second guide at a second side of the tape insertion opening, the first and second guides being separated from one another to provide a first opening width that accommodates insertion of tape cartridges of a first size between the first and second guides, and structured to move within the tape insertion opening to provide a second opening width that accommodates insertion of tape cartridges of a second size different from said first size; and a biasing device coupled to the first and second guides for biasing the first and second guides towards a first position in which the first and second guides are separated from one another by the first opening width;

wherein the biasing device has a biasing force that is overcome by insertion of tape cartridges of the second size in the tape insertion opening such that at least one of the first and second guides are moved, by contact with walls of a tape cartridge of the second size during insertion, towards a second position to thereby accommodate tape cartridges of the second size;

wherein the first guide has a contact portion that contacts and opens a tape cartridge of the first size and of the second size upon insertion of a tape cartridge of the first size and of the second size, the biasing force causing the first guide to remain in the first position for tape cartridges of the first size, and until the biasing force is overcome by the contact with the walls of tape cartridges of the second size.

2. The arrangement of claim 1, wherein the first and second guides are spring guides, each spring guide having a fixed end that is fixed at one of the sides of the tape insertion opening, and a free end, the spring guides extending from the fixed ends at an acute angle from the respective sides.

3. The arrangement of claim 1, wherein the guides are slidably coupled to the respective sides of the tape insertion opening.

4. The arrangement of claim 3, wherein the biasing device is a wire form return spring coupled between the guides.

5. A tape drive comprising:

a drive mouth having interior sides;

a door opener, within the drive mouth, for opening a cartridge door of tape cartridges during insertion of tape cartridges within the drive mouth, the door opener structured to remain in a first position during insertion of a tape cartridge of a first size, and structured to move in direction towards one of the sides of the drive mouth to a second position during insertion of a tape cartridge of a second size to accommodate the tape cartridge of the second size within the drive mouth.

6. The tape drive of claim 5, wherein the first size is smaller than the second size.

7. The tape drive of claim 5, wherein the door opener includes a first spring guide having a fixed end that is fixed at a first one of the sides of the drive mouth, and a free end, the first spring guide extending from the fixed end at an acute angle from the first side.

8. The tape drive of claim 7, wherein the free end of the first spring guide has a contact portion that contacts the cartridge door of a tape cartridge to open the cartridge door as the tape cartridge is inserted into the tape drive.

9. The tape drive of claim 8, wherein the first spring guide is biased to resist bending of the first spring guide towards the first side.

10. The tape drive of claim 9, wherein the first spring guide has a resistance to bending that is overcome by contact of the first spring guide with walls of the tape cartridge of the second size during insertion of the tape cartridge of the second size into the tape drive.

11. The tape drive of claim 10, further comprising a second spring guide having a fixed end that is fixed at a second one of the sides of the drive mouth, and a free end, the second spring guide extending from the fixed end at an acute angle from the second side.

12. The tape drive of claim 11, wherein the second spring guide is biased to resist bending of the second spring guide toward the second side.

13. The tape drive of claim 12, wherein the second spring guide has a resistance to bending that is overcome by contact of the second spring guide with walls of the tape cartridge of the second size during insertion of the tape cartridge of the second size into the tape drive, the first and second spring guides forming a centering guide for centering tape cartridges of the first and second sizes during insertion of the tape cartridges into the tape drive.

* * * * *